(No Model.)
W. H. NEWELL.
WATER CLOSET BOWL.
No. 423,175. Patented Mar. 11, 1890.
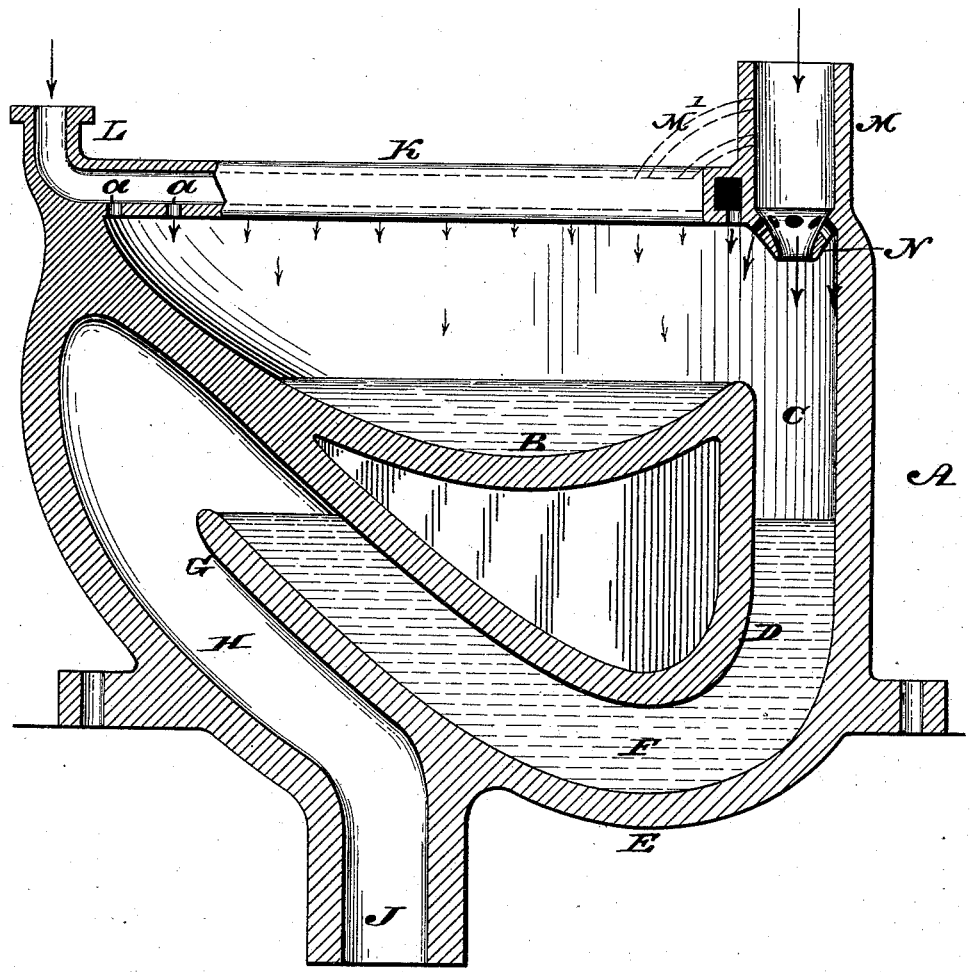
WITNESSES:
L. Douville,
P. F. Nagle.
INVENTOR:
Wm. H. Newell.
BY Giesenheimer & Kutner
ATTORNEYS.

UNITED STATES PATENT OFFICE.

WILLIAM H. NEWELL, OF PHILADELPHIA, PENNSYLVANIA.

WATER-CLOSET BOWL.

SPECIFICATION forming part of Letters Patent No. 423,175, dated March 11, 1890.

Application filed April 19, 1889. Serial No. 307,838. (No model.)

*To all whom it may concern:*

Be it known that I, WILLIAM H. NEWELL, a citizen of the United States, residing in the city and county of Philadelphia, State of Pennsylvania, have invented a new and useful Improvement in Water-Closet Bowls, which improvement is fully set forth in the following specification and accompanying drawing.

My invention consists in providing a water-closet bowl with a deep-seated trap of novel construction, thus reliably sealing said bowl against sewer-gas.

It also consists of means for washing various parts of the bowl, as will be hereinafter set forth.

The figure represents a vertical section of a water-closet bowl embodying my invention.

Referring to the drawing, A designates a water-closet bowl, and B designates the pan on which the soil is received, said pan depending from one side of the bowl, leaving the discharge-passage C at the opposite side thereof. Depending from the pan is a downwardly-projecting portion D, which dips into the bottom E of the trap, said bottom being somewhat of the form of a cup, leaving a passage F between said portion D and the bottom E. The rear wall G of the bottom E projects upwardly above the lower portion of the depending portion D and into the inclined passage H, the latter leading to the discharge-opening J of the bowl.

It will be seen that when water leaves the pan B it enters the passage C, and from thence enters the passage F and fills the same to the top of the wall G, said passage forming a deep-seated trap, which is effective and reliable in its nature in preventing the return of sewer-gas. At the top of the bowl is a channel K, which has perforations $a$, the latter being above the pan B, said channel having a supply-pipe L.

M designates a supply-pipe which opens into the bowl above the channel C and has at its bottom a nozzle or jet orifice N.

It will be seen that when water is admitted into the channel K it is directed by the perforations $a$ upon the pan B, so that the soil is directed therefrom into the channel C, the side of the bowl above said pan being also washed and cleansed by the water from the channel K. The water admitted into the bowl through the pipe M washes the channel C and removes any matter that may have been deposited on the side of said channel, as directed from the pan, the water also rushing through the trap-passage and cleansing the same, the entire bowl, as is evident, being effectively washed.

If desired, the supply branch or pipe L may be dispensed with, and in lieu thereof a connection M' made with the pipe M to supply the passage K with water, as will be seen by the dotted lines.

I am aware that it is not new in a water-closet bowl to have the bed projecting inwardly from one side thereof and having a trap beneath the same in which a downward projection of the bed projects; but I am not aware that the construction herein shown and described is old, wherein the channel in the rear of the bed is vertical and the discharge-channel leading from the trap below the bed is oblique or slanting, so that the discharge of the contents is readily effected.

Having thus described my invention, what I claim as new, and desire to secure by Letters Patent, is—

A water-closet bowl having the inlet-pipe M, the perforated channel K, connected therewith, and the connection M', leading from the pipe M to the perforated channel K, the bed B, with projection D, the vertical passage C, the trap F, having seat E, with projecting wall G, the oblique passage H, and outlet J, the inlet-pipe M being directly over the vertical channel or passage C, said parts being combined substantially as described.

WM. H. NEWELL.

Witnesses:
JOHN A. WIEDERSHIEM,
A. P. JENNINGS.